(12) United States Patent
Chai et al.

(10) Patent No.: US 7,363,406 B2
(45) Date of Patent: Apr. 22, 2008

(54) DYNAMIC ACCESS SCHEDULING MEMORY CONTROLLER

(75) Inventors: Sek M. Chai, Streamwood, IL (US); Bruce A. Augustine, Lake in the Hill, IL (US); Daniel A. Linzmeier, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 319 days.

(21) Appl. No.: 11/007,704

(22) Filed: Dec. 8, 2004

(65) Prior Publication Data
US 2006/0123169 A1 Jun. 8, 2006

(51) Int. Cl.
*G06F 13/14* (2006.01)
(52) U.S. Cl. .................... 710/244; 711/151
(58) Field of Classification Search ............ 710/240, 710/244; 711/217, 105, 151, 158
See application file for complete search history.

(56) References Cited

U.S. PATENT DOCUMENTS

| | | | |
|---|---|---|---|
| 5,918,242 A | 6/1999 | Sarma et al. | |
| 6,295,586 B1 | 9/2001 | Novak et al. | |
| 6,549,991 B1 | 4/2003 | Huang et al. | |
| 6,591,349 B1 | 7/2003 | Steinman et al. | |
| 6,647,456 B1 | 11/2003 | Van Dyke et al. | |
| 7,047,391 B2* | 5/2006 | Dally et al. | 711/217 |
| 7,051,172 B2* | 5/2006 | Mastronarde et al. | 711/158 |
| 2003/0233662 A1 | 12/2003 | Herndon et al. | |

OTHER PUBLICATIONS

Rixner, Scott et al. "Memory Access Scheduling". Computer Systems Laboratory, Stanford University, Stanford, CA 94305, unknown date.

* cited by examiner

*Primary Examiner*—Clifford Knoll (57) ABSTRACT

Bus transactions in a memory controller are scheduled by storing a set of configuration parameters that define a bus scheduling policy, generating values of a set of dynamic cost functions for each bus transaction, ordering the bus transactions in accordance with the bus scheduling policy to produce ordered bus transactions and generating a memory transaction that is derived from the ordered bus transactions. The memory controller includes one or more control registers for storing the set of configuration parameters, a bus interface operable to capture bus transactions from applications, a set of buffers operable to store the bus transactions and the set of dynamic cost functions and one or more registers operable to store the statistical data and a cost policy. The memory controller selects the order of the bus transactions based on an arbitration and selection policy and generates memory transactions to an external memory.

16 Claims, 9 Drawing Sheets

| | ENTRY 1 | ENTRY 2 | ENTRY 3 | ENTRY 4 | ENTRY 5 |
|---|---|---|---|---|---|
| CS | 0 | - | - | - | - |
| BANK | 0 | - | - | - | - |
| ROW | 0 | - | - | - | - |
| COUNT | 1 | - | - | - | - |
| TS | 0 | - | - | - | - |
| RTS | 0 | - | - | - | - |
| QC | 0 | - | - | - | - |

CYCLE 1

| | ENTRY 1 | ENTRY 2 | ENTRY 3 | ENTRY 4 | ENTRY 5 |
|---|---|---|---|---|---|
| CS | 0 | 0 | - | - | - |
| BANK | 0 | 0 | - | - | - |
| ROW | 0 | 0 | - | - | - |
| COUNT | 2 | 2 | - | - | - |
| TS | 0 | 1 | - | - | - |
| RTS | 0 | 1 | - | - | - |
| QC | 0 | 0 | - | - | - |

CYCLE 2

| | ENTRY 1 | ENTRY 2 | ENTRY 3 | ENTRY 4 | ENTRY 5 |
|---|---|---|---|---|---|
| CS | 0 | 0 | 0 | - | - |
| BANK | 0 | 0 | 0 | - | - |
| ROW | 0 | 0 | 5 | - | - |
| COUNT | 2 | 2 | 1 | - | - |
| TS | 0 | 1 | 2 | - | - |
| RTS | 0 | 1 | 0 | - | - |
| QC | 0 | 0 | 0 | - | - |

CYCLE 3

| | ENTRY 1 | ENTRY 2 | ENTRY 3 | ENTRY 4 | ENTRY 5 |
|---|---|---|---|---|---|
| CS | 0 | 0 | 0 | 0 | - |
| BANK | 0 | 0 | 0 | 0 | - |
| ROW | 0 | 0 | 5 | 0 | - |
| COUNT | 2 | 2 | 1 | 2 | - |
| TS | 0 | 0 | 1 | 2 | - |
| RTS | 0 | 0 | 0 | 1 | - |
| QC | 1 | 0 | 0 | 0 | - |

CYCLE 4

| | ENTRY 1 | ENTRY 2 | ENTRY 3 | ENTRY 4 | ENTRY 5 |
|---|---|---|---|---|---|
| CS | - | 0 | 0 | 0 | 0 |
| BANK | - | 0 | 0 | 0 | 0 |
| ROW | - | 0 | 5 | 0 | 0 |
| COUNT | - | 3 | 1 | 3 | 3 |
| TS | - | 0 | 1 | 2 | 3 |
| RTS | - | 0 | 0 | 1 | 2 |
| QC | 1 | 0 | 0 | 0 | 0 |

CYCLE 5

DYNAMIC ACCESS SCHEDULING MEMORY CONTROLLER

FIELD

This invention relates generally to the field of computer memory control. More particularly, this invention relates to memory access scheduling and software enabled control of memory performance.

BACKGROUND

As the speed of computer processors increases, the need for high-speed computer memory also increases. One high-speed computer memory is Synchronous Dynamic Random Access Memory (SDRAM). To increase speed, SDRAM transactions include both command operations (PRECHARGE to close and ACTIVATE to open rows in memory banks) and data operations (READ and WRITE). This protocol is part of a JEDEC (Joint Electron Device Engineering Council) standard that is followed by the semiconductor industry. Many early memory controllers service READ/WRITE requests in the same order as they are received, and at the same time, serializes the command and data operations.

With the widening performance gap between processors and memory, other approaches have been used in memory controllers to speed up the SDRAM command and data operations. In one approach, the command and data operations are classified as background and foreground commands, allowing them to be pipelined or overlapped in time. In another approach, a queue-based method is used where each memory request is broken into primitives to issue command and data operations, thereby allowing the operations to overlap because the primitives can overlap. In a still further approach, READ and WRITE operations are placed in separate 'CAS' (Column Address Strobe) queues, thereby reordering their time of issue. This scheme can be considered a finer definition of the primitives, and is done in order to reduce the overhead of command operations. More recently, the queue-based approach has been extended by interleaving memory requests from multiple sources/requestor.

In a different approach, memory requests from multiple sources are dynamically scheduled. Unlike previously discussed memory controllers, each requestor (such as the CPU, DMA and LCD controller) can issue many pending requests, and the memory controller is allowed to service them in any order because the source maintains strict memory coherency. This split/request bus is recently becoming popular because it allows slow peripherals (and external memory can be slow) to service critical requests first. Similar features of this scheme have been adopted as an industry standard in the AMBA™ (Advanced Microcontroller Bus Architecture) bus protocol.

Current high bandwidth memory controllers are typically built to interleave command operations (PRECHARGE to close and ACTIVATE to open rows in memory banks) with data operations (READ and WRITE), but they are not designed to dynamically reorganize the order of the requests to utilize the maximum memory bandwidth more efficiently and to reduce command operation overheads. They lack support for advanced split request buses, where there can be many pending requests from a single source/requestor (e.g. CPU). Furthermore, these memory controllers lack feedback mechanisms for the operating system or applications to better control how much bandwidth is allocated for a particular source/requestor.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

One aspect of the present invention relates to a method for scheduling bus transactions in a memory controller that controls communication between a bus and a memory. In accordance with the method, a set of configuration parameters that define a bus scheduling policy is stored in the memory controller. For each bus transaction a set of dynamic cost function values is generated. The combination of the dynamic cost function values and the bus scheduling policy allow the bus transactions to be ordered or scheduled to produce ordered bus transactions. Finally, memory transactions are derived from the ordered bus transactions. A bus transaction may be READ or WRITE operation, for example.

The bus transactions may be ordered to provide an overall reduction in memory transaction traffic, to provide an increased memory bandwidth and/or to reduce power consumption of the memory.

The invention is described below with reference to a memory having row, column and bank addresses, but the invention is not limited to such memory geometries. It will be apparent to those of ordinary skill in the art that other memory geometries may be used. In the sequel, a "row of memory" is to be understood as a portion of memory that possesses some common access mechanism. The memory locations need not be aligned or even contiguous.

The dynamic cost functions may be defined according to the set of configuration parameters. Example cost functions include the bus transaction arrival time to the memory controller (time stamp, TS), the number of bus transactions destined to a single row address (row count, COUNT), the bus transaction scheduling priority for bus transactions destined to a single row address (row time stamp, RST), and an indication whether the row address is closed in the memory bank (CMD).

Example configuration parameters include the latency threshold of a bus transaction (age), the comparison scheme to be used (for example: most pending or time stamp), the selection scheme to be used (for example: exhaust row, row count, or source ID count) and the arbitration priority scheme to be used (for example: fixed or round robin).

The memory controller of the present invention dynamically schedules its memory requests using statistical performance information together with programmable arbitration/selection settings. This allows applications to review and set performance/bandwidth usage, which facilitates the maintenance of real-time bandwidth constraints and avoids starvation of components served by the controller.

A further aspect of the present invention relates to a method for software control of memory controller performance. According to the method, statistical data based on memory controller operation is stored in the memory controller and watermark signals are generated for use by applications served by the memory controller. A software application layer interface (API) is provided for the applications. Arbitration and selection policies for the memory controller are generated using a cost rule.

The statistical data is based on memory controller operation and may include data derived from the number of bytes transferred (byte count), data derived from the number of cycles since the last access (cycle count), data derived from the number of requests per SDRAM bank or the number of chip select requests, data derived from the number of commands to open a row per SDRAM bank, and data derived from the number of requests from an application.

Example of cost rules include the target number of cycles per byte transfer, the target number of commands to open a row per cycle, the target number of requests from an application per cycle, the target number of commands to open a row per byte, and the target number of requests from an application per byte. Setting target values for the cost rules allows an application to adjust operation based upon memory performance.

The watermark signals are generated based on available memory controller resources and are used by applications to throttle or control new bus transactions to the memory controller.

An application using the memory controller may select the arbitration and selection policies based on the statistic data and cost policy.

In one embodiment of the invention, the software API includes interchangeable policy modules that accept the watermark and statistic data and application-defined cost rules that define the set of allowable memory controller operation.

Figure 1:
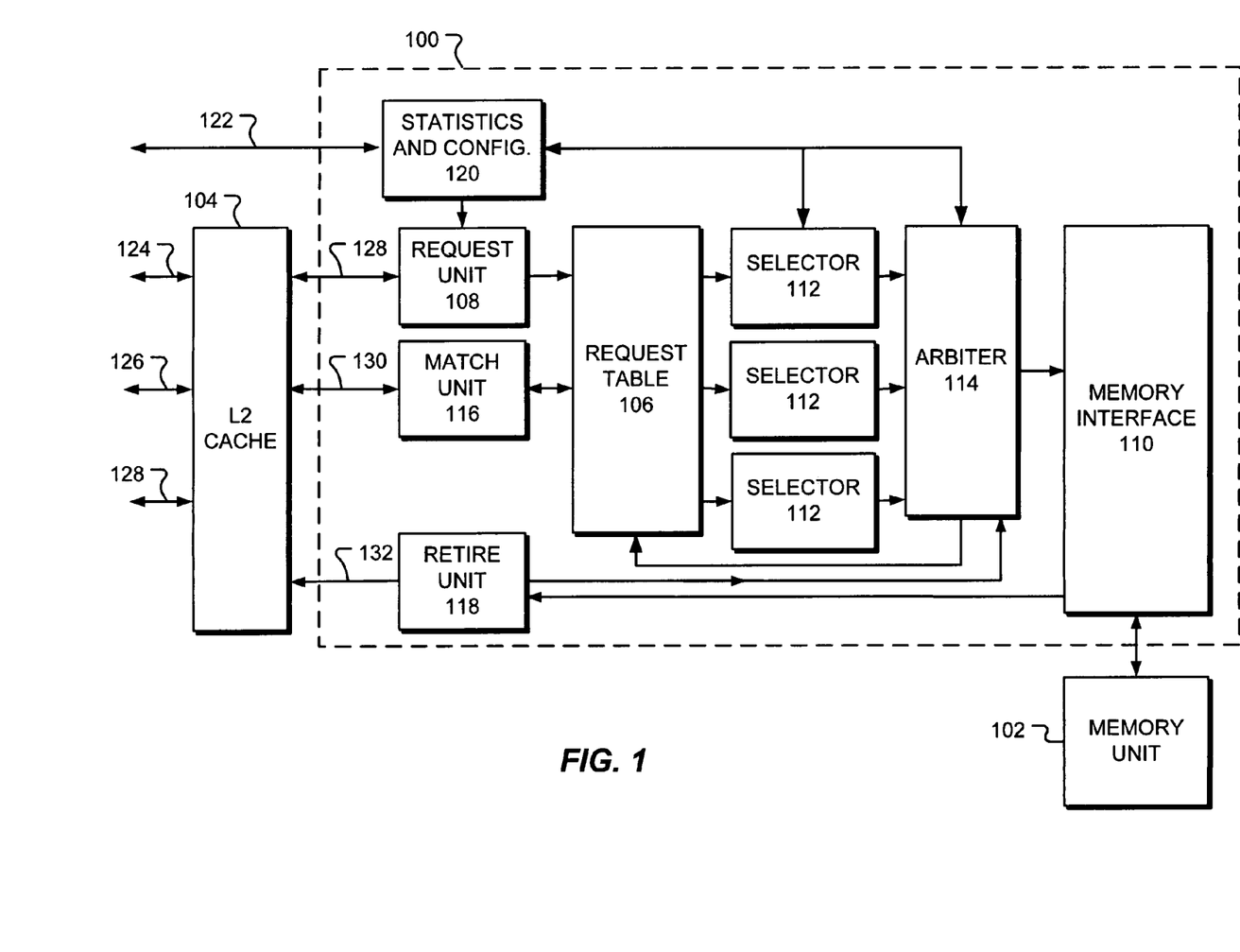
FIG. 1 is a block diagram of a memory controller in accordance with an embodiment of the invention.

A block diagram of one embodiment of the memory controller is shown in FIG. 1. Referring to FIG. 1, the memory controller 100 is coupled to one or more external memory units 102, such as an SDRAM, SRAM or flash memory units, and is operable to move data between the memory unit 102 and a level two (L2) cache 104. The memory controller 100 includes a request table 106 for storing memory transaction requests received from L2 cache bus controller via request unit 108. The request table 106 comprises a set of buffers used to store the bus transactions and dynamic cost functions. The order in which requests stored in the request table 106 are passed to a memory interface 110 is controlled by a timing engine that comprises a series of selectors 112, and an arbiter 114. The bus interface to the L2 cache includes the request unit 108, a match unit 116 and a retire unit 118. The request unit 108 is used to decode memory transaction requests received via a request interface (REQUEST_IF) 130, the match unit 116 uses a check address interface (CHECK_ADDR_IF) 132 to determine if a value stored at the specified address is already loaded in the request table, and the retire unit 118 uses a request complete interface (COMPLETE_IF) 134 to communicate with the L2 cache when a transaction is completed. The memory controller 100 also includes a set of registers 120 that include control registers for storing the configuration parameters for bus scheduling policy, and registers for storing the statistical data and cost policy. The control registers are programmable, via a software application program interface, to allow an application to select that scheduling policy and the cost functions to be used. The memory controller may interface directly to a bus without going through an L2 cache.

An application or operating system can set the arbitration/selection scheme accordingly to meet different bandwidth requirements. This is accomplished through the Statistics and Configuration Port 122 in FIG. 1 that may be coupled to a Scalar Core.

The L2 cache 104 may be coupled to a Scalar Core via port 124, to a DMA controller via port 126 and to a processor via port 128.

During any clock cycle, the memory controller 100 can perform several tasks in parallel. These include accepting requests from L2 cache 104 (via the CHECK_ADDR_IF and REQUEST_IF interfaces) and updating the request table 106, selecting a request table entry, issuing the selected requests to external memories 102, and retiring pending requests by sending data to L2 cache using the COMPLETE_IF interface, 132.

The request table 106 is used to maintain all requests from L2 cache 104 and consists of two parts. The first part is storage for L2 cache requests. This portion stores the address, control, and data elements from any pending requests from L2 cache. The second part is for storing control and performance information for each L2 cache request.

In one embodiment, the request table 106 contains sufficient entries to store up to 32 pending requests from the L2 cache 104.

A watermark (threshold) output is provided to applications to allow the applications to control the rate of new bus transactions to the memory controller. The watermark output is used to guarantee that there are open entries in the request table so that real-time constraints are satisfied. For example, the watermark output can be used to prevent a DMA controller from stalling while transferring data through the L2 cache to physical memory. The memory controller maintains statistical information such as: Byte count, Cycle count, Number of requests per SDRAM bank or SRAM chip selects, Number of ACTIVATE commands, Number of requests per source (DMA, Scalar core, vector processor, L2 cache, etc).

Memory bandwidth is a scarce resource, and the memory controller of the present invention allows algorithm developers to retune their applications and better control how memory bandwidth is used. This is especially true for bandwidth hungry applications such as image processing, and especially in an embedded, portable domain, where power, cost, and board-area reductions can directly translate to slower memory with a narrower data bus. Multiple CPUs or parallel processors still require sustainable bandwidth in order to keep their functional units busy and maintain high performance, since high utilization of functional units is needed for efficiency.

The memory controller of the present invention allows an embedded application or operating system to control the usage of memory bandwidth. Algorithms with varying real-time constraints can change the memory controller arbitration/selection schemes to reallocate bandwidth for different computation phases. Much like a DMA controller priority scheme, the memory controller extends the bandwidth allocation from the bus to external memories. However, the priority scheme is not hard coded, and the application can first review the statistical information to determine current performance level before resetting the new bandwidth allocation.

The memory controller may be implemented as a peripheral component in a System on a Chip (SoC) or Field Programmable Gate Array (FPGA). Compared to a standard memory controller, the controller of the present invention includes a request table rather than queues to hold pending requests. In addition, it dynamically schedules memory-access requests with real-time constraints using next request selection logic that is cognizant of source/requestor and arbitration logic for both static memory and SDRAM to select from the Request Table. The controller provides statistical feedback registers for applications to review performance/bandwidth utilization levels and has programmable settings for arbitration and selection schemes. This allows a user to change the arbitration and selection scheme dependent upon the statistical feedback. The controller also provides tightly coupled interfaces for connection to an L2 cache and a programmable watermark output that may be used to throttle the number of pending requests.

In order to increase the memory system performance the memory controller not only reschedules the memory requests, possibly completing them out of order, but also maintains certain bandwidth requirements for real-time constraints. The memory controller allows an application to review statistical information and to set performance/bandwidth utilization levels. Video processing, used in applications such as lane-departure warning, vehicle/pedestrian detection, and license plate recognition, require high memory bandwidth that can be supported through a well-balanced memory hierarchy. The memory controller may form an integral part of a memory subsystem used to provide sufficient bandwidth for scalar cores and parallel processors.

In comparison to prior memory controllers, the memory controller 100 provides unique mechanisms to handle real-time bandwidth and latency constraints. In many embedded applications, such as image processing, the imager interface must transfer a frame of data in a certain amount of time (thereby defining the frame per second rate), and the memory controller 100 can operate efficiently without arbitrarily reorder memory requests from the imager interface.

The memory controller utilizes a request table to store pending requests because a queue-based design naturally leads to in-order servicing of the memory requests. Furthermore, the memory controller 100 provides statistical information that allows applications to control performance/bandwidth usage.

Figure 2:
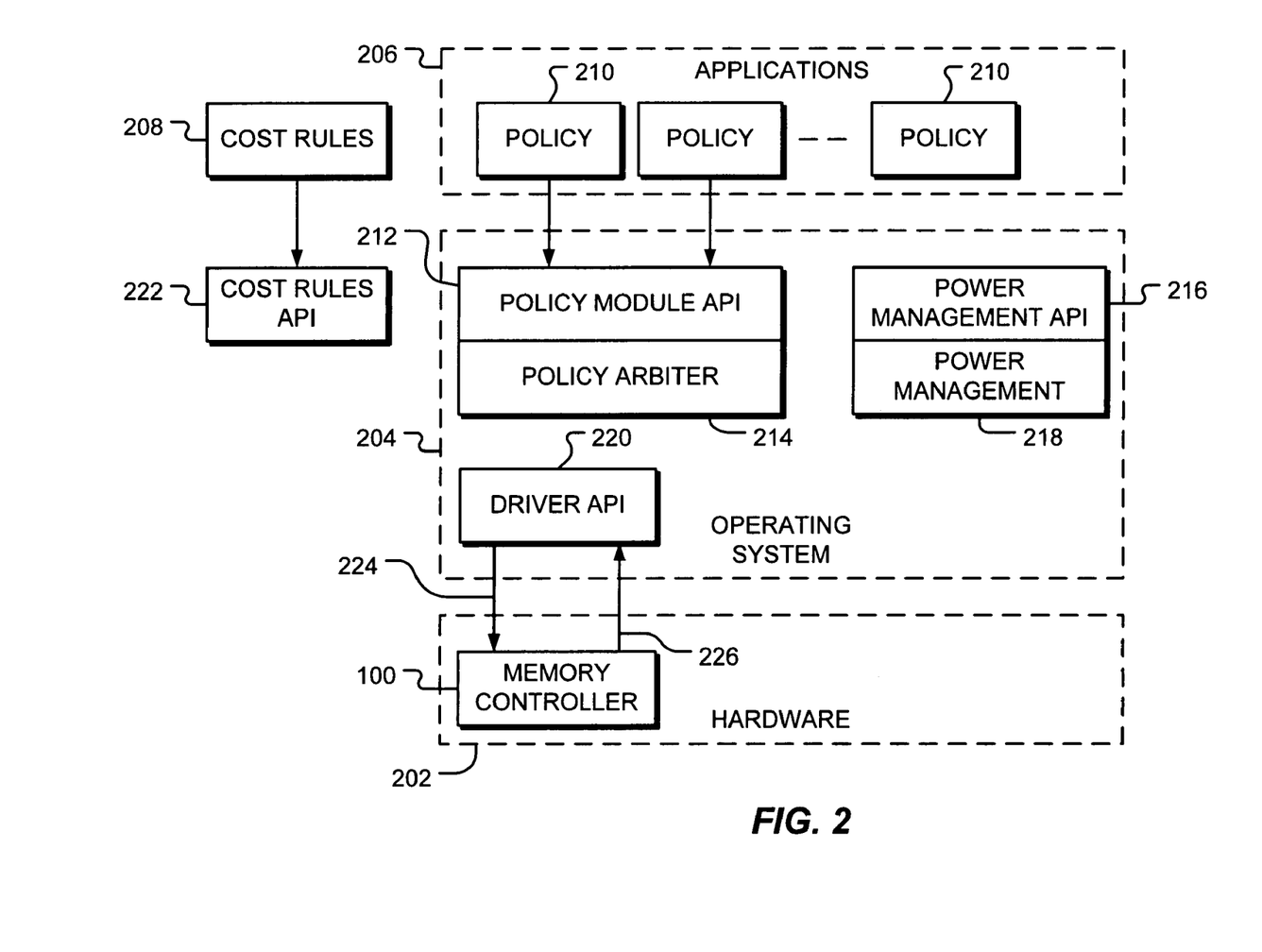
FIG. 2 is a diagrammatic representation of a software framework for use of a memory controller in accordance with an embodiment of the invention.

FIG. 2 is a block diagram of an embodiment of a software framework to enable use of the memory controller 100. Referring to FIG. 2, the memory controller 100 is a component of a hardware system 202. An operating system 204 facilitates communication between the hardware system 202 and software applications 206. In addition to the software applications, one or more software modules 208 that define costs rules are provided. Theses modules may be defined by a user. A number of policy modules 210 are provided. These modules may be plugged into user applications. A policy module Application Programming Interface (API) 212 is provided. The API is a set of public (visible to other programs) function calls allowing communication between the applications 206 and the operating system 204. A policy arbiter module 214 is also provided to perform arbitration between different policy modules. A power management API 216 is provided to facilitate communication between the applications 206 and a power management module 218. A driver API 220 manages communication between the operating system 204 and the hardware 202. Finally, a cost rule API 222 is provided.

In operation, an application selects an appropriate policy module to specify how the memory controller 100 is to schedule memory transactions. It is known that different applications may require different scheduling policies for optimal performance. The cost rule modules 208 are designed to correspond to the requirements of the application and the hardware. In this way, a user of the memory controller can use software to control the configuration of the memory controller 100. In operation, programmable arbitration and selection settings 224 are passed to the memory controller and the memory controller collects statistical data 226 that is passed back to the applications via the driver API 220. This provides performance feedback to the application and allows the application to modify its demands on the hardware to achieve optimal performance.

Figure 3:
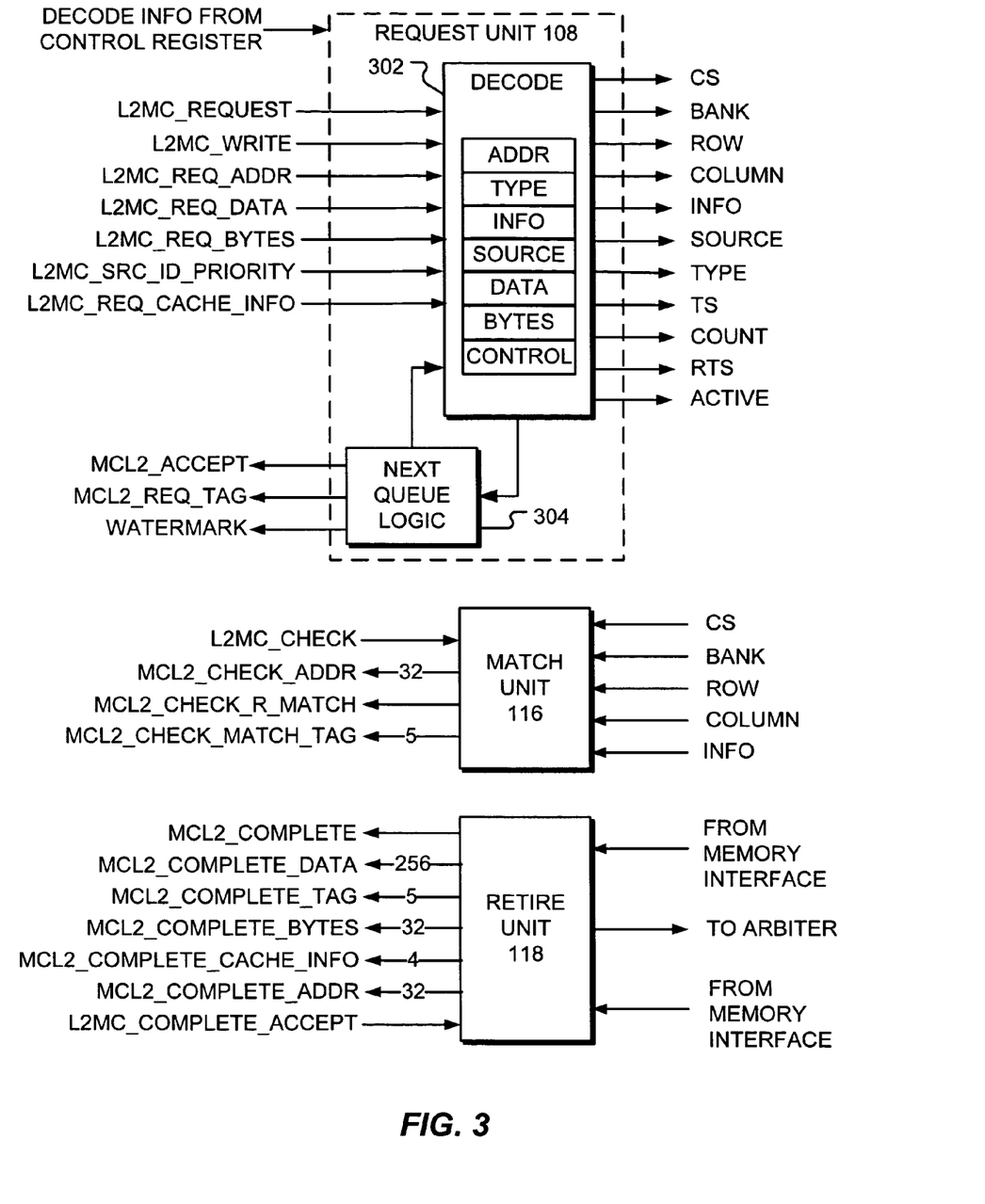
FIG. 3 is a diagrammatic representation of a memory controller interface in accordance with an embodiment of the invention.

FIG. 3 is a block diagram of an embodiment of a memory controller interface to an L2 cache. In FIG. 3, a request unit 108 includes decoder 302 that is configured using decode information from control registers (120 in FIG. 1). The decoder 302 receives command and data inputs from an L2 cache. Inputs are denoted by the prefix L2MC_, which denotes that information is flowing from the L2 cache to the memory controller (MC). In response to the inputs, the decoder produces values to be stored in the request table (106 in FIG. 1). The values include the memory location {CS, BANK, ROW, COLUMN} of the requested address, as well as a time stamp (TS) related to the arrival time of the request. The request unit 108 also includes a next queue logic unit 304 that returns data, such as a watermark signal (WATERMARK) and a request tag (MCL2_REQ_TAG) to the L2 cache. The next queue logic unit 304 determines where a new request is to be placed in the request table 106.

The memory controller interface also includes a match unit 116, which contains logic to determine whether a specified address is already in the request table. The match unit 116 looks at the location of the in memory {CS, BANK, ROW, COLUMN} of the requested address, together with other information from the request table.

The memory controller interface also includes a retire unit 118, that returns data values to the L2 cache (or bus). Data read from the external memory 102 may be passed back via the request table, in which case data is returned to the request table and then read from the request table when the L2 cache or bus is ready. Alternatively, if the L2 cache or bus is always ready, data can be sent directly without going though the request table.

In this embodiment, all requests are accompanied with a tag. When data is sent from the memory controller via the retire unit, the tag, denoted by MCL2_COMPLETE_TAG in FIG. 3, is sent along with it.

Figure 4:
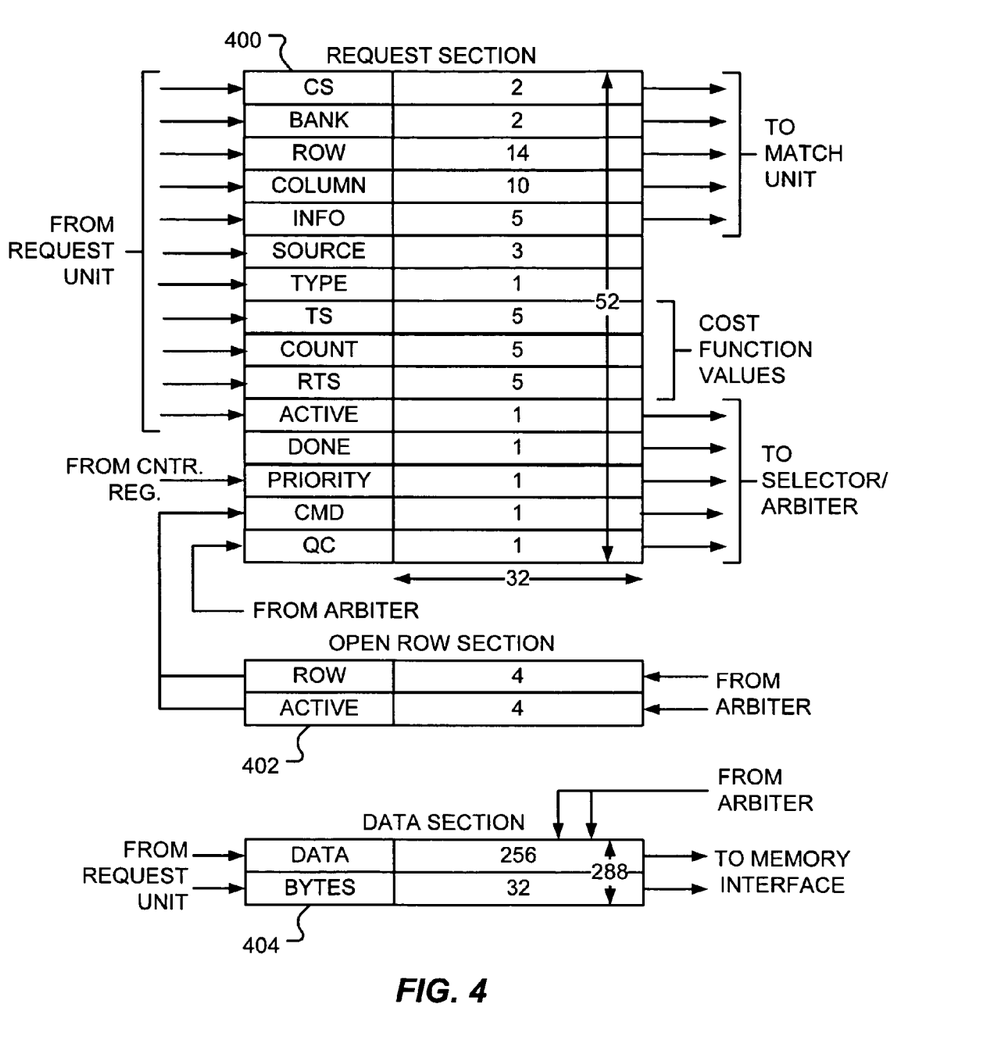
FIG. 4 is a diagrammatic representation of a request table of a memory controller in accordance with an embodiment of the invention.

FIG. 4 shows a request table of an embodiment of the memory controller. The request section 400 of the table stores information received from the request unit (108 in FIG. 1) for each of up to 32 different requests. The address information may be received from a 32-bit wide address bus. The interpretation of the 32-bit address may be controlled by a BAS (Bank Address Setting) control register setting that selects the proper Bank and Row Address fields from the 32-bit address. In this exemplary embodiment, the address information includes a Chip Select (CS) field, which may be bits 28-27 of the 32-bit address bus for example. The Chip Select bits are used to encode four external chip select signals to control four memory chips. The address also includes a Row Address (ROW) field, which may be bits 26-13 of the 32-bit address bus, a Bank Address (BANK) field, which may be bits 12-11 or bits 26-25 of the 32-bit address bus. The 2-bit bank address is used to select the different banks within a memory chip. The address also includes a Column Address (COLUMN), which may be bits 10-0 of the 32-bit address.

The TYPE field in the request table indicates whether the memory request is a read or write, while the INFO or TAG field is a unique identification number provided by the L2 cache to label each pending request. For example, it may be 5 bits wide to identify a maximum of 32 outstanding requests. The SOURCE field is an encoded bit field that identifies the source of the request. The memory controller can give priority to certain request based on the source of the request. Example sources are DMA, a scalar core, vector streaming units, cache line evictions, etc.

Associated with each entry in the request table is a set of cost function values, such as the bus transaction arrival time to the memory controller (time stamp, TS), the number of bus transactions destined for the same row address (row count, COUNT), the bus transaction scheduling priority for bus transactions destined to the same row address (row time stamp, RTS), and an indication if the row address is closed in the memory bank (CMD). The progress of the bus transaction in the memory controller is also recorded, for example, the ACTIVE is set when a request is received, the DONE field is set when request has been serviced, and the QC field is set when the request is in the queue controller. Finally, the request table also contains a PRIORITY field that can be set to override the request scheduling and cause the request to be processed as soon as possible. The request table also includes an Open Row Section 402 and a Data Section 404. The Open Row Section 402 receives information from the arbiter to allow the corresponding CMD entries to be updated in the request table 106. The Data Section 404 stores data from the request unit and supplies it to the memory interface (110 in FIG. 1).

Figure 5:
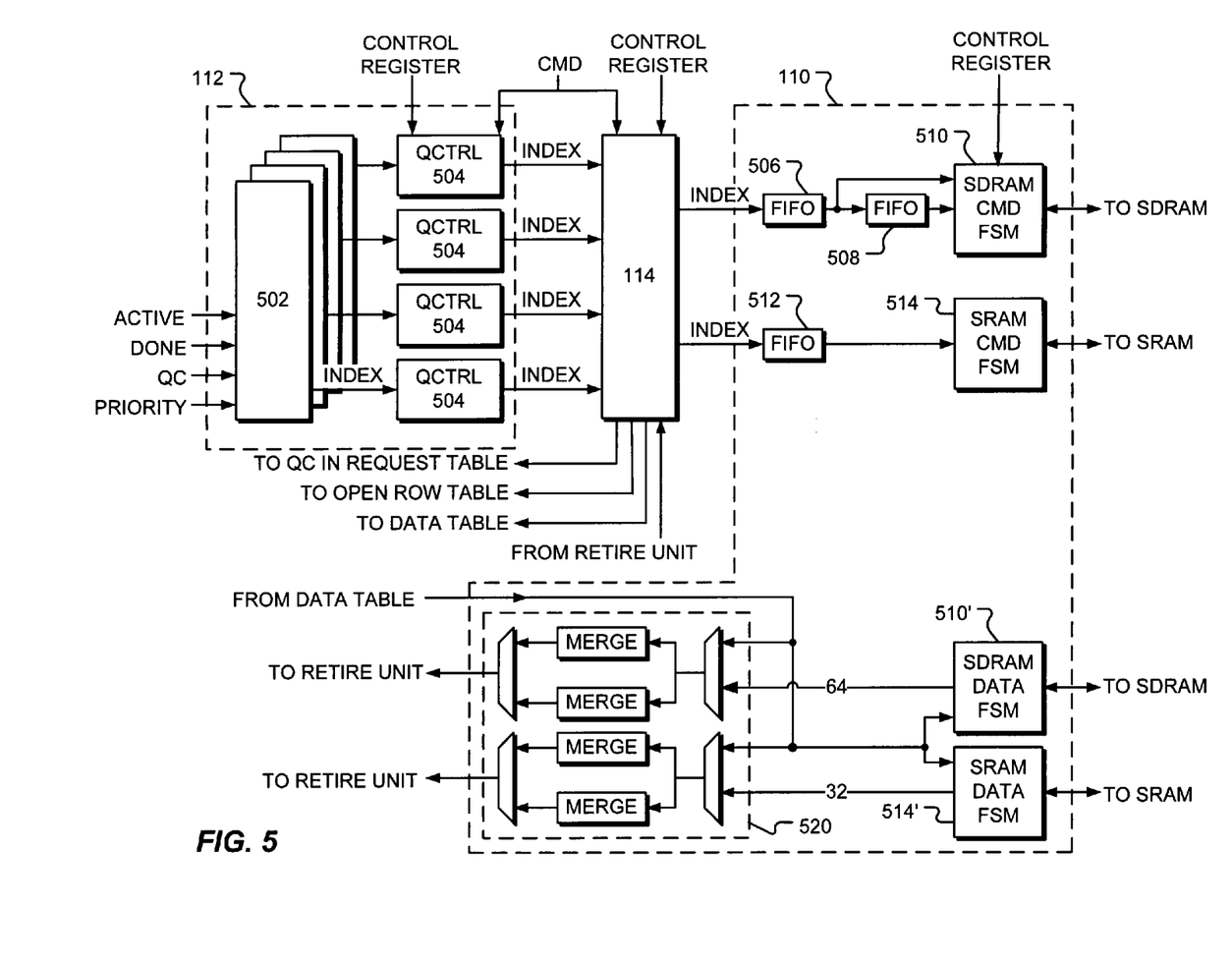
FIG. 5 is a block diagram of a selector/arbiter unit and memory interface of a memory controller in accordance with an embodiment of the invention.

FIG. 5 is a block diagram of an embodiment of a selector/arbiter unit 112 and a memory interface 110 of a memory controller. The selector/arbiter unit 112 includes comparators 502 and queue controllers 504, one of each for each memory bank, and an arbiter 114. For a given memory bank, a comparator 502 selects which row entry is to be used based on access to the bank in memory, and the corresponding queue controller 504 selects within the memory bank. The arbiter 114 then selects between memory banks. For memory WRITE operations, the indices of the memory location to be accessed are pipelined with the data to be written in FIFO buffers 506 and 508, from where they are processed by an SDRAM command finite state machine 510. Similarly, indices are also passed to FIFO buffer 512, where they pipelined with data and processed by an SRAM command finite state machine 514. The finite state machines 510 and 514 generate control signals according to the protocol for the corresponding memory device. For memory WRITE operations, SDRAM data finite state machine 510' and SRAM data finite state machine 514' receive data from the Data Section of the request table (404 in FIG. 4). For memory READ commands, data from the external memory is received by SDRAM command finite state machine 510' and SRAM command finite state machine 514'. These are the same finite state machines as 510 and 514 respectively, but are shown as separate units to make clear the functionality during different operations. The data may be packed by merge unit 520 into the appropriate width for the cache or bus. The data may also be 'merged' with data from the data section of the request table via a byte mask. For example, if the cache requires 64-bit data values, but can only ask in the form of 128-bit requests, the other 64-bits are stored in the request table (untouched) and then merged with the new 64-bit data from the SDRAM. Data is then sent back to the cache as a 128-bit word.

Figure 6:
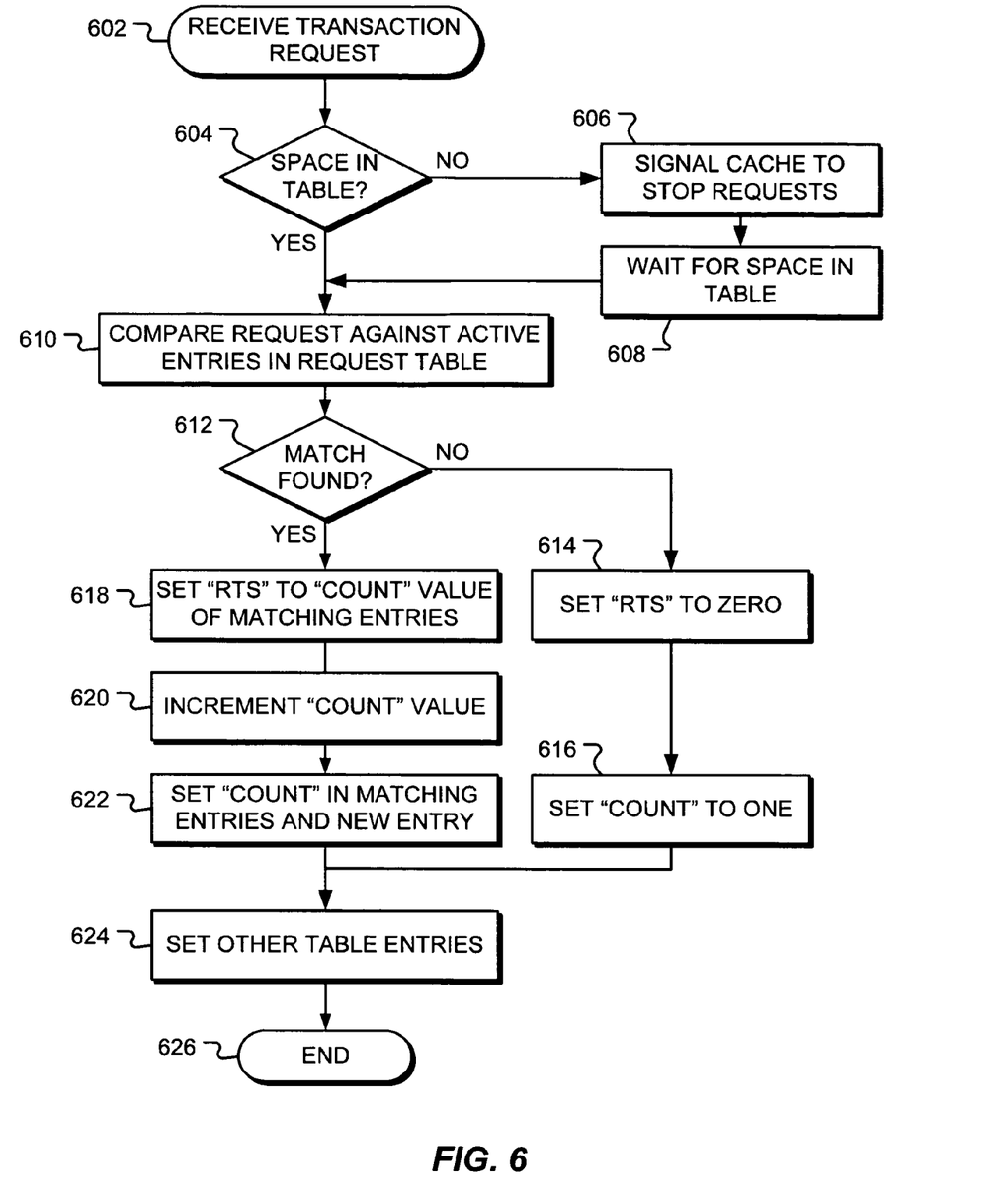
FIG. 6 is a flow chart of a method for updating a request table in accordance with an embodiment of the invention.

FIG. 6 is a flow chart 600 of a method for updating a request table in accordance with an embodiment of the invention. Referring to FIG. 6, a memory transaction request is received at block 602. At decision block 604, a check is made by the next queue logic to determine if there is space in the request table to store a new entry. If not, as depicted by the negative branch from decision block 604, a signal is sent at block 606 to the L2 cache (or other source of request) to stop sending requests. At block 608 the requester waits until space becomes available in the table (as earlier requests are satisfied) and then flow continues to block 610. Flow also continues to block 610 if space is immediately available, as depicted by the positive branch from decision block 604. At block 610 the requested bank, row and chip are compared with entries already in the table. If no match is found, as depicted by the negative branch from decision block 612, the row time stamp (RTS) is set to zero at block 614 and the row count (COUNT) is set to one at block 616. If a match is found, as depicted by the positive branch from decision block 612, the row time stamp (RTS) is set to the COUNT value of the matching entries at block 618, the COUNT value is incremented at block 620 and the incremented COUNT value is stored in all of the matching entries, including the new entry at block 622. Thus, the COUNT value for a table entry represents the number of request table entries having the same bank, row and chip as that entry. At block 624 the other fields of the new table entry are set. For example, the time stamp (TS) of the previous entry is incremented and stored in the new entry. The update of the request table for the new request is complete at block 626.

In another embodiment, the check made by the next queue logic is done one cycle before every entry in the request table is used. The MCL2_Accept signal is used to inform the requestor of this condition.

Figure 7:
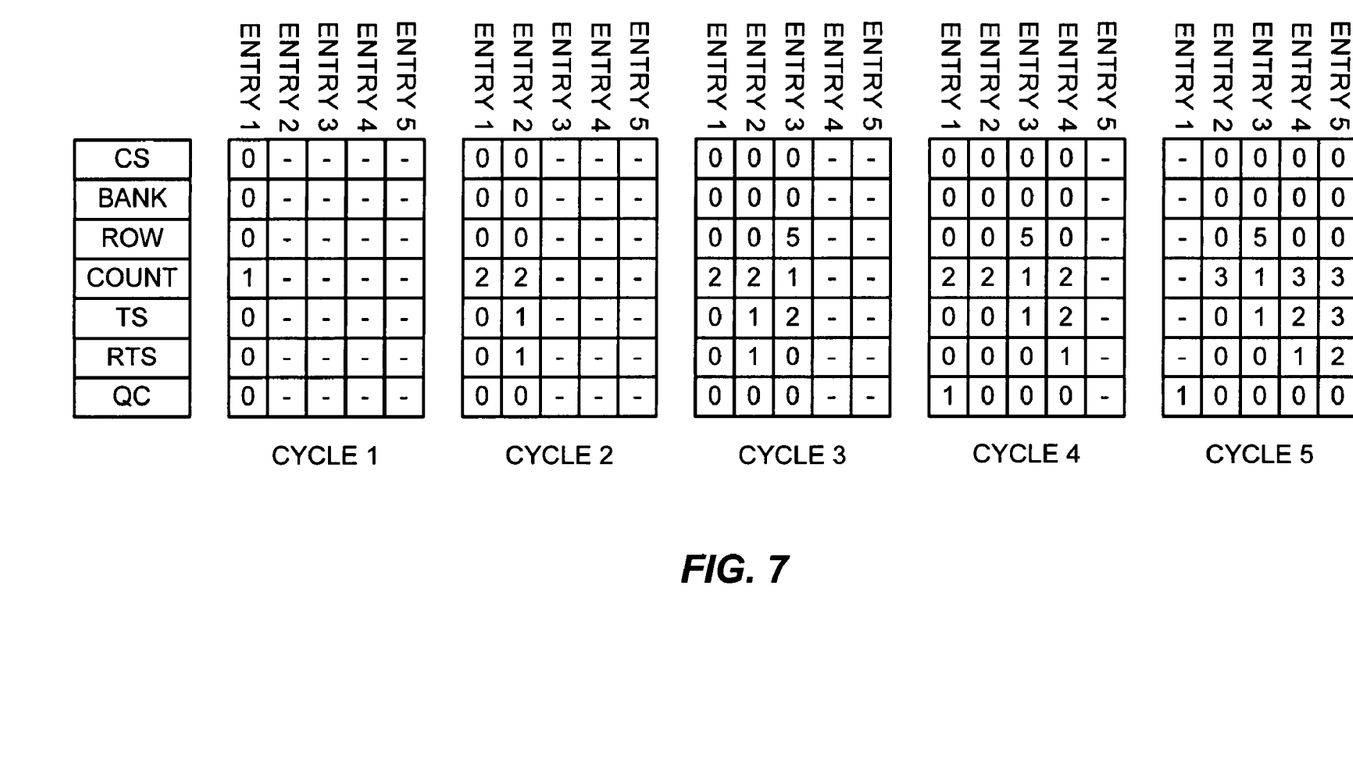
FIG. 7 is a diagrammatic representation of a request table of a memory controller in accordance with an embodiment of the invention.

A diagrammatic representation illustrating the updating of a subset of a request table is shown in FIG. 7. FIG. 7 shows 5 table entries for the chip select (CS), BANK, ROW, time stamp (TS), row time stamp (RTS), COUNT and queue controller (QC) fields of a request table in five consecutive time cycles. The TS, RTS and COUNT fields represent dynamic cost functions generated for the memory transaction requests. In time cycle 1, a first transaction request is received for {CS, BANK, ROW}={0,0,0}. These values are written in the corresponding fields. Since this is the first request and there are no matching entries, TS and RTS are set to zero and COUNT is set to 1. In time cycle 2, a second transaction request is received for {CS, BANK, ROW}={0, 0,0}, possibly for a different column. This matches the first entry in the table, so the RTS field for entry 2 is set to the COUNT value of the first entry. The COUNT value is then incremented and written both to the first entry and the new entry. The TS value is incremented and written in entry 2. In time cycle 3, a transaction request is received for {CS, BANK, ROW}={0,0,5}. This does not match any previous entry, so COUNT is set to 1 and RTS is set to zero. The TS value is incremented and written in entry 3. In time cycle 4, a third transaction request is received for {CS, BANK, ROW}={0,0,0}. This matches the first and second entries, so the RTS field for entry 4 is set to the COUNT value of the first entry (2). Also in time cycle 4, the first entry is passed to the queue controller, so the QC field in entry 1 is set to one. The COUNT value is then incremented because of new request, but also decremented because an entry has been serviced, so the unchanged COUNT value is written to the first and second entries and the new entry. The TS of entries 2 and 3 is decremented because the first entry has been serviced. The next TS value is written to entry 4. Similarly, the RTS field of entry 2 is decremented. In time cycle 5, a fourth transaction request is received for {CS, BANK, ROW}={0,0,0}. This matches entries 2 and 4 (entry 1 is not checked), so the RTS field for entry 5 is set to the COUNT value of the second entry (2). The COUNT value is then incremented (to 3) and written to entries 2 and 4 and the new entry 5.

Figure 8:
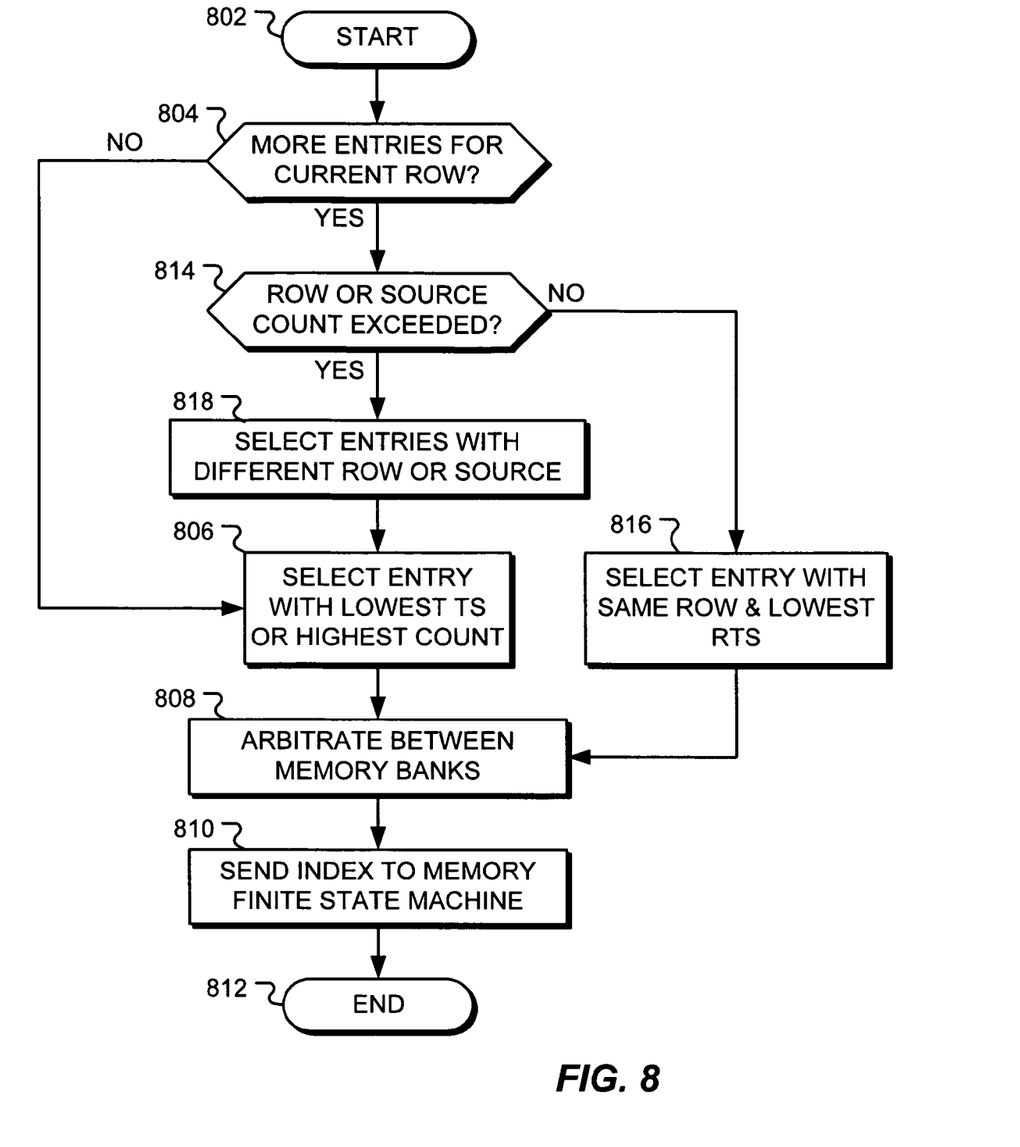
FIG. 8 is a flow chart of a method for selecting memory transactions in accordance with an embodiment of the invention.

A flow chart 800 of an exemplary method for determining the order in which the request table entries are serviced is shown in FIG. 8. Referring to FIG. 8, following start block 802, a check is made at decision block 804 to determine whether the request table has any more entries for the current row. This check may be performed by a queue controller. In one embodiment of invention, the memory controller 100 has a queue controller for each bank of each memory chip. Each queue controller searches table entries having corresponding bank (BANK) and chip select (CS) identifiers. If there are no more entries with the current row number (for this bank and chip), as depicted by the negative branch from decision block 804, an entry in the request table is selected at block 806. This selection may be determined by the entry having the lowest time stamp (TS), i.e. the oldest entry, or the entry with the highest COUNT value. Since multiple entries may have the highest COUNT value, the oldest of these entries may be selected. The criterion may be selected by software control. At block 808, the arbiter 114 selects between the entries selected by the queue controllers. A variety of arbitration schemes may be used, such as (1) Row First (Select requests that are opening new rows. This is done using the CMD field)

(2) Column First (Select requests that do not open new rows. This is also done using the CMD field), (3) Fixed Priority (Select the queue controller such that the top queue controller has more priority than the lower queue controller), and (4) Round Robin (Select the queue controllers in a fixed order). The arbitration scheme may be selected by setting a parameter in the control register.

At block 810, the memory index of the selected request is sent to a memory finite state machine that generates control signals to access the appropriate memory chip. The process terminates at block 812.

If there are more entries with the current row number (for this bank and chip), as depicted by the positive branch from decision block 804, flow continues to decision block 814, where an internal register is checked to determine if a row counter has exceeded a certain threshold. This determines if the queue controller has serviced a maximum number of requests to this row, and needs to proceed to another row. A second internal register is also checked to determine if a source counter has exceeded a certain threshold. This determines if the queue controller has serviced a certain number of requests from the same source (based on the SOURCE field in request table), and needs to proceed to another row. If neither the row counter nor the source counter has exceeded its threshold, as depicted by the negative branch from decision block 814, the request table entry with the lowest row time stamp (RTS) for the current row is selected at block 816 and flow continues to arbitration block 808. If either the row counter or the source counter has exceeded its threshold, as depicted by the positive branch from decision block 814, a subset of request table entries is selected at block 818 for which the requests are from different sources or request different row numbers. At block 806, the next entry is selected from the subset of entries in accordance with the specified selection scheme.

Thus, in one embodiment of a method for scheduling bus transactions in a memory controller, a set of configuration parameters that define a bus scheduling policy are stored in control registers and for each bus transaction a set of dynamic cost functions values is generated. The bus transactions are then generated in accordance with the bus scheduling policy and the cost functions to produce ordered bus transactions that are then used to generate memory transactions. The bus transactions may be generated by an L2 cache, a DMA controller, a processor or other bus controller. The memory transactions may be used to access static or dynamic memory.

The prioritization scheme is chosen dependent upon the properties of the memory system. For example, if the memory system is a DRAM that requires 3 cycles to precharge a bank (the precharge closes any open rows), 3 cycles to activate a row, and 1 cycle to access a column of an activated row, then it is clearly more efficient to access all the requested columns of a row while that row is activated. Thus, once the scheduler selects a row, it is most efficient to service all requests for that row while it is activated.

Figure 9:
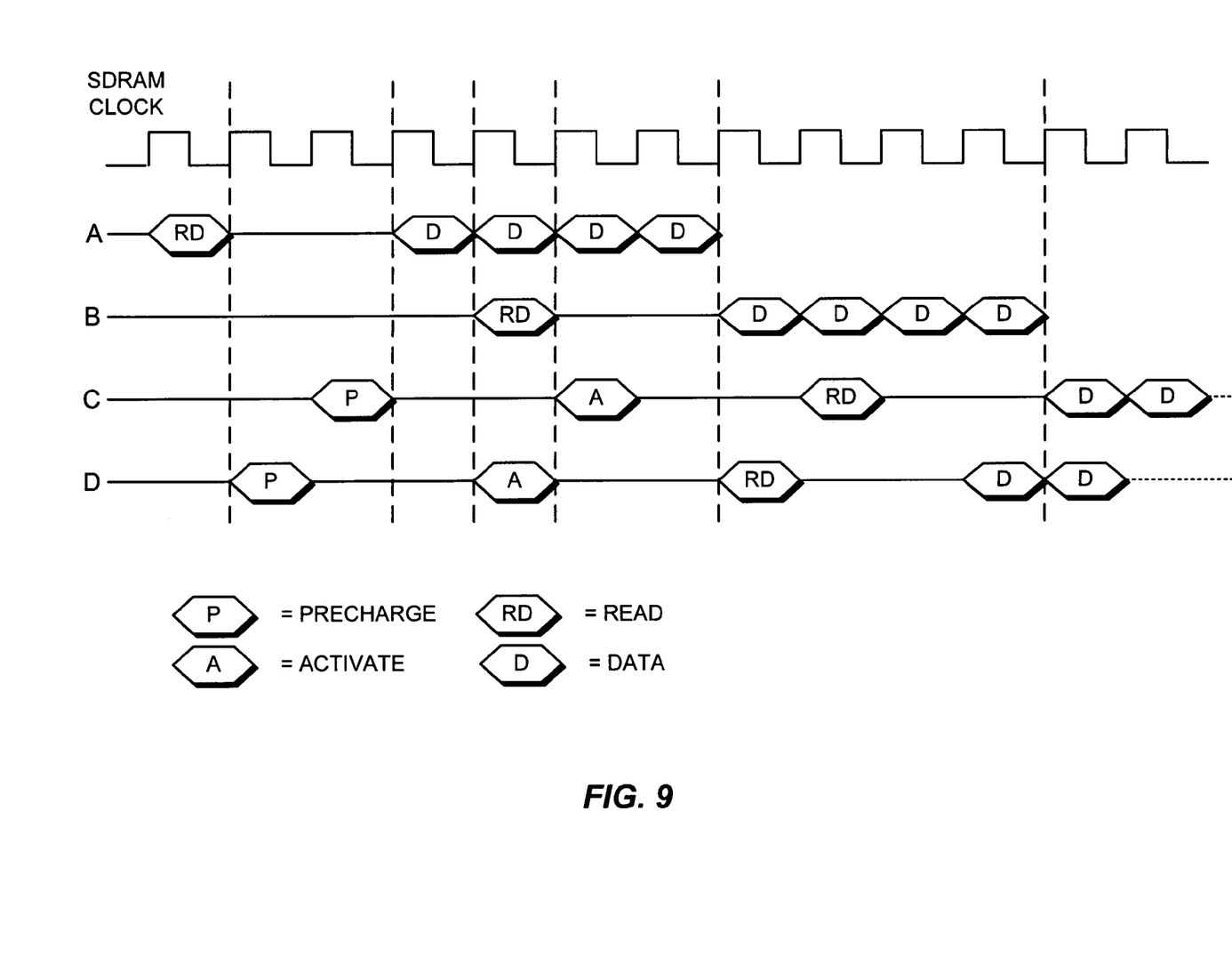
FIG. 9 is a diagrammatic representation of pipelined memory requests in accordance with an embodiment of the invention.

FIG. 9 shows several examples of pipelined memory requests. In this example, Request A has already issued the Read (RD) command. Request B, for any opened-row in any bank, can proceed while the second data element is read from Request A. The example shows a CAS (Column Address Strobe) latency of two cycles, and Request B can utilize the data-bus to get its data the cycle after Request A. Request C is to a new row in a different bank than Request A. The Precharge (P) and Activate (A) command can be issued at any time, as long as there is no other command sent and there is enough latency between the Precharge, Activate, and Read commands. Request C is also shown to utilize the data-bus the cycle after Request B. Assuming that there is no Request B or Request C, then Request D can proceed immediately after Request A, as shown. If Request C and Request D are to the same bank as Request A, then the precharge command cannot be issued until after Request A completes its data transfers.

The control register in the statistics and control module 120 in FIG. 1, holds the configuration parameters. These parameters are used in other modules within the memory controller and are programmed via statistics and configuration port (122 in FIG. 1). Table 1 describes example parameters that could be implemented.

TABLE 1

Example Control Register Parameters

| Parameter | Default | Description |
| --- | --- | --- |
| BAS | 0 | Bank Address Setting (1 kB blocks) 0 = Row/Bank/Col, 1 = Bank/Row/Col |
| AutoPrecharge | 0 | AutoPrecharge setting 0 = off |
| TRP | 1 | PRE period. PRE to ACT, PRE to Refresh |
| TRCD | 1 | ACT to RD/WR |
| TRAS | 3 | ACT to Precharge |
| TRRD | 1 | ACT to ACT for different bank |
| TRC | 1 | ACT to ACT for same bank |
| TCL | 2 | RD to Data (CAS latency) |
| TWR | 2 | Write Completion period |
| TRFC | 7 | Refresh period |
| TRFH | 781 | Refresh counter |
| MemBusRatio | 1 | Memory to Bus speed ratio |
| QueuePriority | 0 | 0 = Ordered, 1 = AgeThreshold, 2 = Source, 3 = Load/Store |
| QctlScheme | 0 | 0 = Priority, 1 = MostPending, 2 = LeastPending |
| Age | 1 | Latency threshold |
| ArbPriority | 0 | 0 = Row, 1 = Col, 2 = Fixed 0-1-2-3, 3 = RoundRobin |
| DataCoherence | 0 | 0 = None, 1 = Ordered by Age |
| RT_Flush | 0 | 0 = Normal, 1 = Stop new requests until all requests are serviced. |
| ReOrder_b | 0 | 0 = Reorder, 1 = Disable reordering of memory requests |

These parameters allow the memory controller to be configured for a particular memory system and also select parameters for the scheduling policy.

In one embodiment, the memory reordering can be disabled using the ReOrder configuration parameter for debug or other reasons. All requests can be serviced using the order of arrival. In addition, the request table entries can be flushed using the RT_Flush configuration parameter during chip power-down or similar reasons.

The buffer registers in the configuration and statistics module 120 may be used to store statistical information such as: Byte count, Cycle count, Number of requests per SDRAM banks or SRAM chip selects, Number of ACTIVATE commands, and Number of requests per source.

The main application or operating system can then set the arbitration/selection scheme accordingly to meet different bandwidth requirements.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for scheduling bus transactions in a memory controller, comprising:

storing a set of configuration parameters that define a bus scheduling policy, the set of configuration parameters relating to a latency threshold for a bus transaction and to a threshold for the number of bus transactions from a single source of bus transactions;

generating values of a set of dynamic cost functions for each bus transaction in accordance with bus scheduling policy, the set of dynamic cost functions comprising the arrival time of the bus transaction at the memory controller and a number of bus transactions destined for the same row address;

storing the values of the dynamic cost functions and an identifier of the source of the bus transaction in a request table for each bus transaction;

ordering the bus transactions in accordance with the bus scheduling policy dependent upon the stored values of the dynamic cost functions to produce ordered bus transactions; and generating a memory transaction that is derived from the ordered bus transaction.

2. A method in accordance with claim 1, wherein ordering the bus transactions provides an overall reduction in memory transaction traffic.

3. A method in accordance with claim 1, wherein ordering the bus transactions increases memory bandwidth.

4. A method in accordance with claim 1, the set of configuration parameters further comprises configuration parameters relating to a scheduling priority for bus transactions destined to the same memory row address and wherein the set of dynamic cost functions further comprises count value indicative of the number of entries in the request table for the same memory row address and a dynamic cost function relating to the state of the memory bank.

5. A method in accordance with claim 1, wherein the set of configuration parameters control one or more of comparison, selection, and arbitration policies of the memory controller.

6. A method in accordance with claim 1, wherein the set of configuration parameters comprises at least one configuration parameter that is used in a comparison scheme and is selected from the group consisting of a timing of a bus transaction, a selection scheme for bus transactions, and an arbitration scheme for bus transactions.

7. A method in accordance with claim 1, wherein the set of configuration parameters are used in a selection scheme selected from the group consisting of a scheme to exhaust all pending requests to the same row, a scheme to service a number of pending requests based on the number of requests having the same memory row address, and a scheme to service requests with a source identification at a higher priority.

8. A method in accordance with claim 1, wherein the set of configuration parameters comprises an arbitration scheme selected from the group consisting of a scheme of fixed priority, a scheme of round-robin priority, a scheme of servicing requests that are opens a new memory row address, and a scheme of servicing requests that are within the same memory row address.

9. A method for ordering bus transactions in a memory controller, the method comprising:

storing a set of configuration parameters, the set of configuration parameters comprising a configuration parameter relating to a latency threshold for bus transactions, and a configuration parameter relating to a threshold for the number of bus transactions from a single source of bus transactions;

storing a plurality of transaction requests and associated transaction source identifiers in a request table;

storing a plurality of cost functions associated with the plurality of transaction request in the request table; and for each of a plurality of memory banks:

selecting a bank transaction request from the plurality of transaction requests in the request table dependent upon the plurality of cost functions and the set of configuration parameters to form a set of bank transaction requests, and selecting a bus transaction from the set of bank transaction requests dependent upon the set of configuration parameters, wherein a cost function of the plurality of cost functions comprises a time stamp value indicative of the time of the transaction request.

10. A method in accordance with claim 9, wherein the set of configuration parameters further comprises a configuration parameter relating to a scheduling priority for bus transactions destined to the same row address, the plurality of cost functions further comprises a count value indicative of the number of entries in the request table for the same memory row as the transaction request, and wherein selecting the bank transaction request comprises selecting a transaction request having the greatest count value.

11. A method in accordance with claim 9, wherein the time stamp value comprises a row time stamp value indicative of the time order in which the transaction request was received relative to other transaction requests for the same memory row as the transaction request.

12. A method in accordance with claim 11, wherein selecting the bank transaction request comprises selecting a transaction request having the earliest row time stamp from among those transaction request having the same memory row address as a preceding bank transaction request.

13. A method in accordance with claim 9, wherein the time stamp value is indicative of the time order in which the transaction request was received relative to other transaction requests in the request table.

14. A method in accordance with claim 13, wherein selecting the bank transaction request comprises selecting a transaction request having the earliest time stamp value.

15. A method in accordance with claim 9, wherein the cost function for a transaction request comprises an indicator of whether the row address is closed in the memory bank.

16. A method in accordance with claim 9, further comprising updating the request table when a transaction request in the request table is serviced.

* * * * *